United States Patent [19]

Oshitani et al.

[11] Patent Number: 4,844,999
[45] Date of Patent: Jul. 4, 1989

[54] NICKEL ELECTRODE FOR ALKALINE BATTERY AND BATTERY USING SAID NICKEL ELECTRODE

[75] Inventors: Masahiko Oshitani; Hiroshi Yufu, both of Takatsuki, Japan

[73] Assignee: Yuasa Battery Company Limited, Takatsuki, Japan

[21] Appl. No.: 199,930

[22] Filed: May 26, 1988

[30] Foreign Application Priority Data

Apr. 11, 1988 [JP] Japan .................................. 63-88416

[51] Int. Cl.$^4$ ............................................. H01M 4/32
[52] U.S. Cl. ..................................... 429/223; 29/623.1
[58] Field of Search .......................................... 429/223

[56] References Cited

U.S. PATENT DOCUMENTS 4,481,128 11/1984 Jackovitz et al. .................... 429/223

FOREIGN PATENT DOCUMENTS

| 0232193 | 9/1959 | Australia | 429/223 |
| 0030133 | 3/1980 | Japan | 429/223 |
| 0201257 | 11/1983 | Japan | 429/223 |
| 2060241 | 10/1979 | United Kingdom | 429/223 |

OTHER PUBLICATIONS

Vilche et al., "The Electrochemical Behavior of Iron in Stagnant and Stirred Potassium Carbonate-Bicarbonate Solutions in the 0°-75° C. Temperature Range" in Corrosion Science, vol. 25, No. 11, pp. 985–987 (1985).

Ziebold et al., "Quantitative Analysis with the Electron Micro-Analyzer" in Analytical Chemistry, vol. 35, No. 6, pp. 620–627, (1963).

Ziebold et al., "An Empirical Method for Electron Microanalysis" in Analytical Chemistry, vol. 36, No. 2, pp. 322–327 (1964).

Advertizing Brochure Entitled "SuperProbe JXA-8600 Series Electron Probe X-Ray Microanalyzers" of Jeol Ltd., Tokyo, Japan.

*Primary Examiner*—Donald L. Walton
*Attorney, Agent, or Firm*—Watson, Cole, Grindle & Watson

[57] ABSTRACT

A nickel electrode for an alkaline battery includes a porous alkali-proof metal fiber substrate as a current collector and an active material principally formed of a nickel hydroxide powder is precluded from formation of the higher oxide, $\gamma$-NiOOH, is improved in the ratio of utilization of the active material, and is provided with a high energy density and a long service life when the nickel hydroxide powder employed therein possesses a pore radius in the range of 15 to 30 Å, a total pore volume of not more than 0.05 ml/g, and a specific surface area in the range of 15 to 30 m$^2$/g. An alkaline battery is also provided by the invention which uses the nickel electrode described above.

5 Claims, 8 Drawing Sheets

Effect of standing conditions before 1st charging on active material utilization.

Fig. 5

(A): Utilization : 101%    (B): Utilization · 84%

E.P.M.A. of cobalt (A); After standing for 3 days at 40°C.

(B); After standing for 1 day at 20°C.

Effect of various additives.

NICKEL ELECTRODE FOR ALKALINE BATTERY AND BATTERY USING SAID NICKEL ELECTRODE

BACKGROUND OF THE INVENTION

1. Field of the Invention

This invention relates to a nickel electrode for use in an alkaline battery and to a battery using this nickel electrode.

2. Description of the Prior Art

The nickel electrodes heretofore generally in alkaline batteries are in the form of sintered electrodes. A porous substrate is prepared by sintering nickel powder on a perforated steel sheet. The process by which the porous substrate is filled with active material is called impregnation. The impregnation is accomplished by means of four steps carried out in sequence, namely, soaking the substrate in a nitrate solution, converting into hydroxide in alkaline solution, rinsing with water, and drying. This four step process is repeated until the desired amount of active material is obtained.

This impregnating method, however, is highly complicated because of the many inevitable treatment repetitions. This increases the cost of the product. Moreover, since the porosity of the substrate is limited by practical reasons to the maximum of 80%, and since the loading density of active material is very low, batteries produced by this method have at best a maximum energy density as 400 mAh/cc at the best.

Non-sintered electrodes have been widely developed. For example, as disclosed in Japanese patent application Disclosure No. Sho 56(1981)-59460, an electrode is produced by mixing twenty-odd % by weight of graphite powder as a conductive additive with nickel hydroxide powder coated with cobalt hydroxide, extruding the mixture into a strip, and then laminating two layers of this strip to both sides of a nickel plate, which is a current collector. The produced electrode requires a large amount of graphite, which is the conductive additive, just like a pocket-type electrode. The conductive additive contributes nothing to the volume of the electrode so that it makes the volumetric density of the electrode lowered and produces a large amount of carbonate due to decomposition of the graphite. Therefore, the conductive additive can not be used for a battery such as a sealed nickel-cadmium battery, which contains a small amount of electrolyte.

As one solution of this drawback, for example, pasted nickel electrodes which use a metal fiber substrate of a high porosity (95%) in place of the aforementioned substrate and which permit the required loading of the nickel hydroxide powder to be accomplished in one treatment, thus eliminating the repetitive treatments, have been approaching the level of practical use.

The pasted nickel electrode is produced, as disclosed in Japanese patent application Disclosure No. Sho 61(1986)-138,458, by preparing an active material powder from an aqueous nickel nitrate solution and an aqueous sodium hydroxide solution, adding to the active material a CoO additive to form an electroconductive network in the active material, imparting the consistency of paste to the resultant mixture by addition thereto of a viscous liquid having carboxymethyl cellulose dissolved in water, and loading the pasty mix into a fiber substrate. This nickel electrode is less expensive than the sintered electrode and possesses an energy density as high as 500 mAh/cc.

In consequence of the steady trend in recent years to reducing the weight of portable electronic devices, the market needs are growing for electrodes of the class possessing a high energy level approximating 600 mAh/cc. To meet this need, there is a growing necessity for imparting high density to the nickel hydroxide powder itself because the porosity of the substrate has its own limit.

Nickel hydroxide powder of high density has found popular utility as part of the raw material for parkerizing steel sheets. This nickel hydroxide powder is produced by a method which comprises dissolving nickel nitrate or nickel sulfate in a weakly basic aqueous ammonia solution, thereby giving rise to tetra-ammine nickel (II) complex ion in a stable state, and adding to the resultant solution an aqueous sodium hydroxide solution, thereby inducing deposition of nickel hydroxide so gradually as to preclude growth of voids in the particles being deposited. The use of the produced powder in its unmodified form as part of the active material for batteries, however, entails several drawbacks.

For example, the charge-discharge reaction of the nickel hydroxide electrode proceeds because of free passage of protons ($H^+$) within the nickel hydroxide crystals. When the nickel hydroxide powder increases in density, the compactness of the crystals thereof is heightened so much as to restrict the freedom of passage of protons within the crystals and the specific surface area of the powder is decreased so much as to increase the current density, with the inevitable result that the high oxide, $\gamma$-NiOOH, which causes impairment of discharge and life characteristics as manifested in stepped discharge and swelled electrode, will be produced in a large amount.

The swelling of a nickel electrode due to formation of $\gamma$-NiOOH is caused by conversion of high density $\beta$-NiOOH to low density $\gamma$-NiOOH, as disclosed in J. Appl. Electrochem., 16,403 (1986) and J. Power Source, 12,219 (1984)

SUMMARY OF THE INVENTION

An object of this invention is to provide a nickel electrode which precludes the formation of the higher oxide, $\gamma$-NiOOH, which ensures enhanced utility of the active material, and which enjoys high energy density and long service life, as well as to provide an alkaline battery using the nickel electrode.

The other objects and characteristics of the present invention will become apparent to those skilled in the art from the following description of preferred embodiments as illustrated in the accompanying drawings.

DETAILED DESCRIPTION OF PREFERRED EMBODIMENTS

This invention specifically is directed to a pasted nickel electrode using a porous alkali-proof metal fiber substrate as a current collector and a nickel hydroxide powder as a principal component of the active material and intended for use in an alkaline battery, which nickel electrode is characterized by the fact that the nickel hydroxide powder possesses a pore radius in the range of 15 to 30 Å, a total pore volume of not more than 0.05 ml/g, and a specific surface area in the range of 15 to 30 $m^2/g$, and to an alkaline battery using such a nickel electrode.

The aforementioned nickel electrode for an alkaline battery is such that the nickel hydroxide active material thereof contains 2 to 7% by weight of cadmium and this cadmium is present in the state of solid solution in the crystals of the nickel hydroxide.

The alkaline battery of this invention using the aforementioned nickel electrode is characterized by a process of manufacture which comprises incorporating the nickel electrode in a battery proper without entailing any forming, injecting an electrolyte in the battery property, allowing the contents of the battery proper to stand for not less than one day, thereby allowing the cobalt compound in the electrolyte to be thoroughly dissolved and deposited, and thereafter subjecting the battery to first charging.

When a high-density nickel hydroxide powder is produced with the minimized inner pore volume it suffers heavy occurrence of the higher oxide, γ-NiOOH. When a different metal i.e., ion, metal ions of a different species, particularly cadmium ions, are distributed in the crystals of nickel hydroxide, the ions function to deform the crystals, to add to the freedom of passage of protons, to improve the ratio of utilization, and to diminish the formation of γ-NiOOH.

Figure 1:
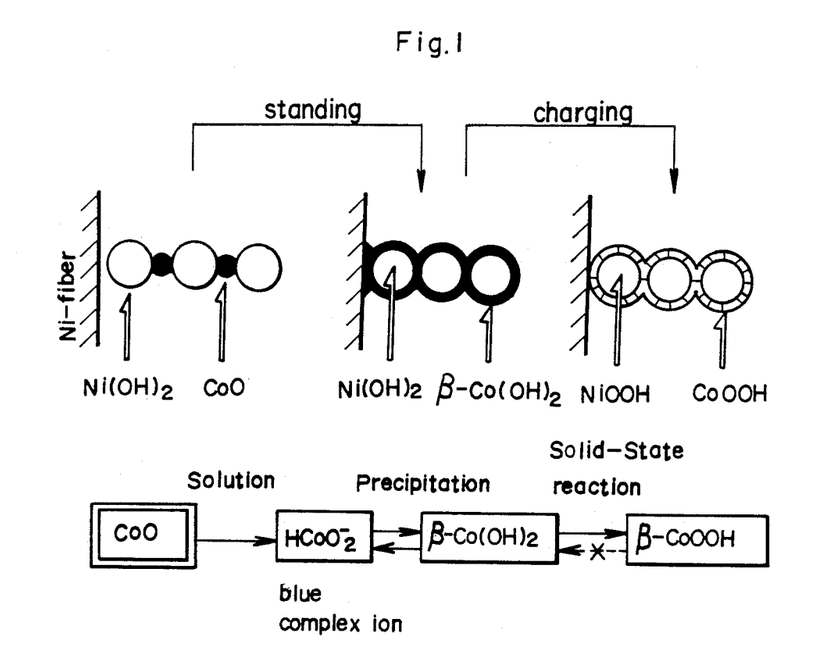
FIG. 1 is a mode showing the reaction mechanism of CoO additive.

When a cobalt compound additive is dissolved outside the crystals of nickel hydroxide to establish connection between the current collector and the nickel hydroxide particles by virtue of the reaction, $HCoO_2^- \rightarrow \beta\text{-}Co(OH)_2$, before the battery is charged, the cobalt compound is converted into cobalt oxyhydroxide of high conductivity by virtue of the reaction, $\beta\text{-}Co(OH)_2 \rightarrow CoOOH$, to smoothen the flow of electrons between the nickel fibers of the current collector and the nickel hydroxide particles and increase the ratio of utilization of the active material. The mechanism of the reactions mentioned above is depicted in the model in FIG. 1.

The present invention will be described in detail below with reference to working examples.

EXAMPLE

Figure 2:
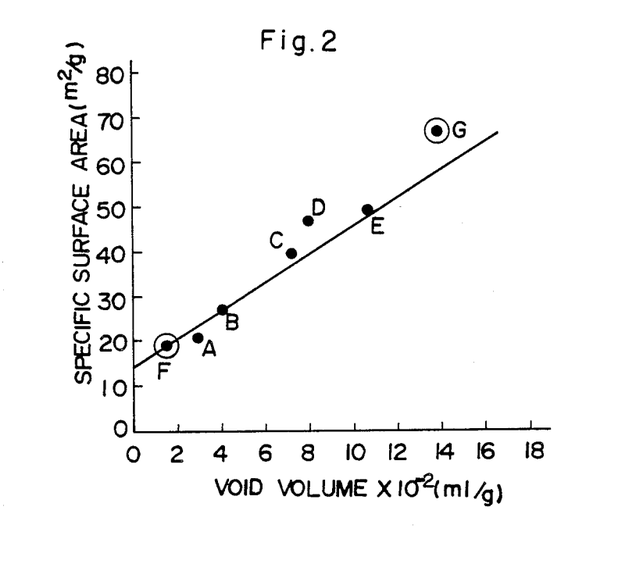
FIG. 2 is a diagram showing the relation between the specific surface area and the pore volume of nickel hydroxide particles.

In an aqueous solution of nickel nitrate containing a small amount of cadmium nitrate, ammine complex ions of nickel and cadmium were formed by addition of ammonium nitrate to the aqueous solution. The resultant solution and an aqueous sodium hydroxide solution added dropwise thereto were vigorously stirred to induce decomposition of the complex ions and gradual deposition and growth of nickel hydroxide particles having cadmium contained in the form of solid solution therein. In the conventional high-concentration alkali solution having a pH value exceeding 14, nickel hydroxide particles are deposited randomly and their pore volume is large. To avoid this, it is necessary to lower the alkali concentration to the order of pH 10 to 12 and effect the deposition gradually at a temperature in the range of 20° to 90° C. By the regulation of pH and temperature, nickel hydroxide particles could be produced with widely varied specified surface area and pore volume. The results are shown in FIG. 2. In the diagram, A, B, C, D, and E represent the results of samples formed solely of nickel hydroxide and F those of a sample formed of nickel hydroxide containing cadmium in the form of solid solution and G those of a sample of the conventional method formed solely of nickel hydroxide.

Between the specific surface area and the pore volume, there exists a corelation that the pore volume in the particles tends to increase with an increasing specific surface area. It may be safely concluded that a high-density active material of small pore volume is naturally destined to possess a small specific surface area.

Figure 3:
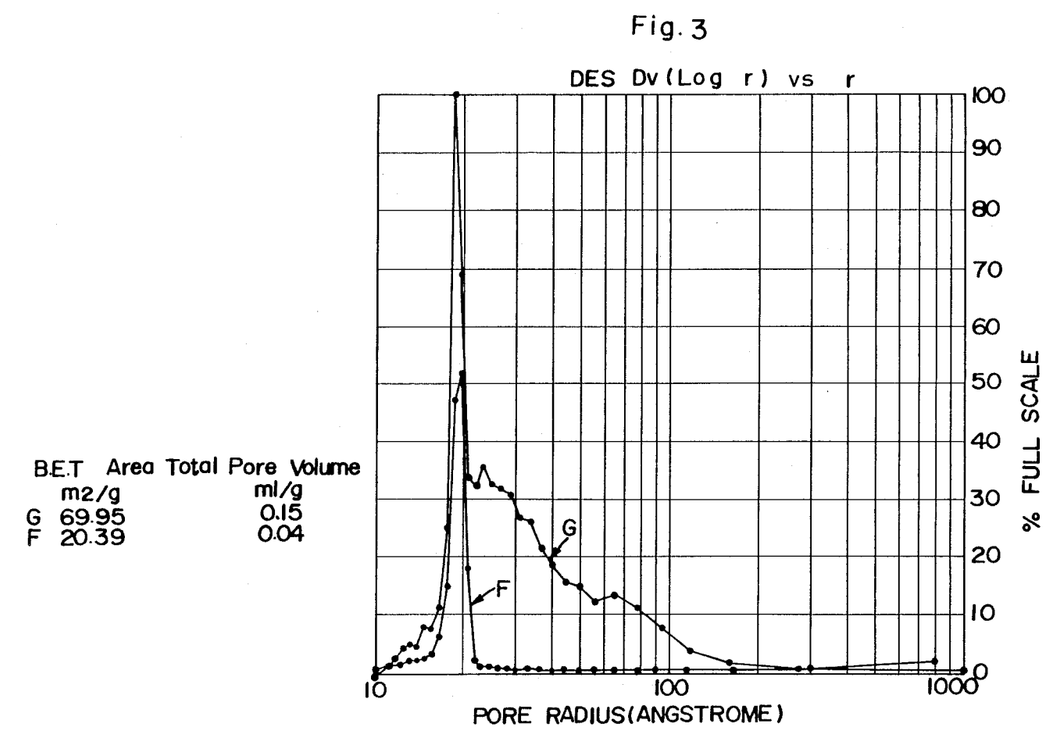
FIG. 3 is a diagram showing the curves for pore size distribution obtained of the conventional nickel hydroxide powder and the high-density nickel hydroxide powder of the present invention.

In accordance with the method heretofore known widely in the art, nickel hydroxide particles of specific surface area of about 70 $m^2/g$ were produced by adding dropwise an aqueous nickel nitrate solution of an aqueous alkali solution of high concentration of pH 14.5 at 90° C. The pore size distribution of the nickel hydroxide particles is shown by the curve G in FIG. 3 and that of the aforementioned high-density active material F by the curve F in the same diagram. In the particles G produced by the conventional method, pores having radii in a wide range of 15 to 100 Å occur in a large amount and randomly so that the total volume of the pores is 0.15 ml/g, a value equaling 30 to 40% of the total volume of particles (0.41 ml/g), indicating that the particles had fairly large voids. In the case of the particles of F, the pore volume was only 0.04 ml/g, a value roughly equaling one fourth of the pore volume of the particles of G. The results indicate that the particles F had a density 20 to 30% higher than that of the particles of G.

The data clearly indicate that for the particles of active material to possess high density, they must possess as small a specific surface area and pore volume as possible.

In a varying nickel hydroxide powder mentioned above, a small amount of a varying cobalt compound such as CoO, α-Co(OH)$_2$, β-Co(OH)$_2$, or cobalt acetate which, on dissolution in an alkaline electrolyte, given rise to a Co(II) complex ion, was added and thereafter an aqueous 1% carboxymethyl cellulose solution was added to produce a flowable paste liquid. A nickel electrode was obtained by loading a prescribed amount of the paste liquid on an alkali-proof fiber substrate such as, for example a nickel fiber substrate, possessing a porosity of 95%, drying the loaded electrode, and press molding the dried electrode.

For the purpose of finding the ratio of utilization of active material and the ratio of formation of γ-NiOOH by the charge-discharge reaction, a battery was assembled by opposing a cadmium electrode to the aforementioned nickel electrode as a counter electrode inside a battery housing through the medium of a nonwoven polypropylene fabric separator and then injecting in a potassium hydroxide electrolyte in the battery housing. After the injection of the electrolyte, the cobalt compound as an additive was dissolved therein in a corrosive potential and left standing under varying conditions to establish connection between the nickel hydroxide particles.

Figure 4:
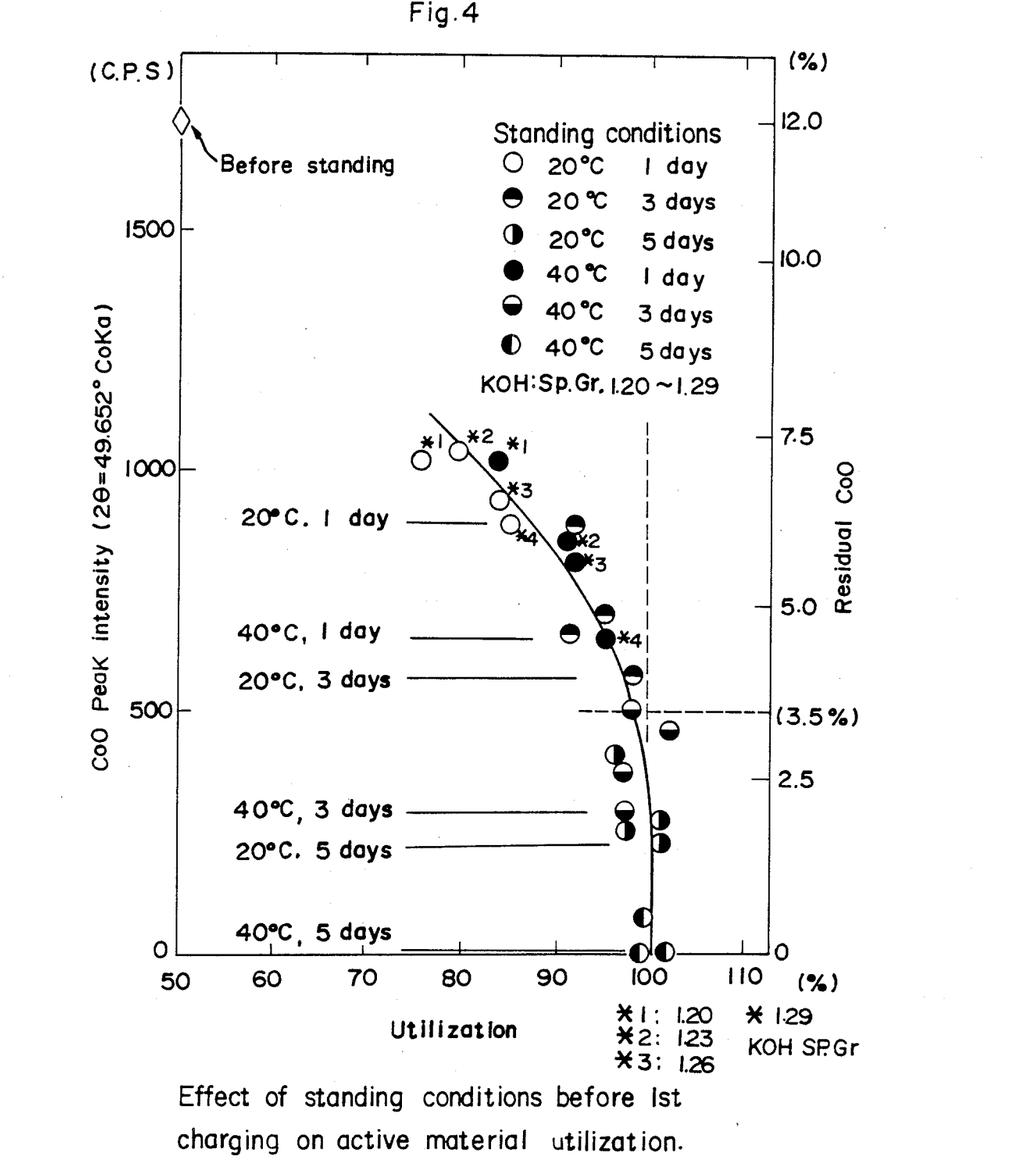
FIG. 4 is a diagram showing the relation between the standing condition and the ratio of utilization of active material.
Figure 5:
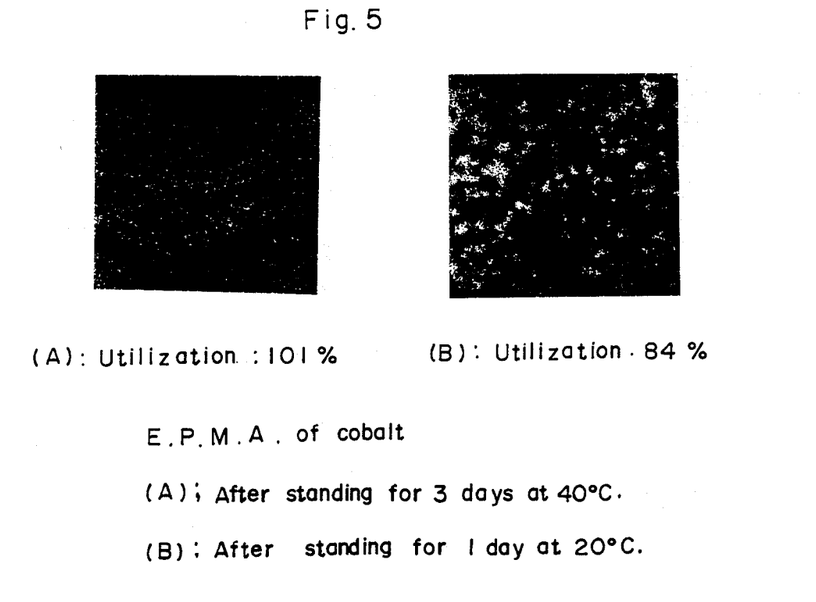
FIG. 5 is a distribution image of cobalt on an electrode surface obtained by an electron probe microanalyzer (E.P.M.A.) after solution and deposition of a CoO additive.

The relation between the standing conditions and the ratio of utilization of active material found by using CoO as an additive and a nickel hydroxide powder possessing a specific surface area of 70 m$^2$/g is shown in FIG. 4. The data show that the standing conditions which constitute an important process for the formation of an electroconductive network are such that the ratio of utilization of active material is heightened and the period required is shortened in proportion to the electrolyte concentration and the standing temperature are increased and the dissolved CoO amount functions effectively. It is further noted from the distribution image of cobalt on the electrode surface obtained after the solution and deposition of the additive (FIG. 5) that the proportional relation mentioned above is ascribable to the uniformity of dispersion (thoroughness of the formation of network) according to the solution and deposition of the additive.

Figure 6:
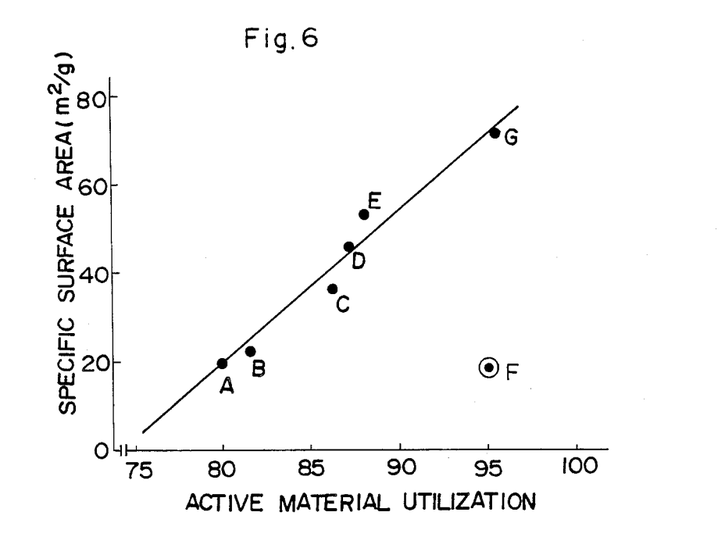
FIG. 6 is a diagram showing the relation between the kind of nickel hydroxide and the ratio of utilization of the active material.

The relation between the kind of nickel hydroxide and the ratio of utilization of active material under proper standing conditions is shown in FIG. 6.

In the composition of active material which is formed solely of nickel hydroxide, there exists a proportional relation. This fact indicates that for the purpose of enabling the active material to be utilized in a high ratio, the active material must possess a large specific surface area. It naturally implies that the desirability of the active material increases with the increasing pore volume and the decreasing density thereof. The powder F which contains a small amount of cadmium in the crystals of nickel hydroxide, however, exhibited as high a ratio of utilization as the conventional powder G in spite of a small specific surface area.

TABLE 1

|  | G | F |
|---|---|---|
| Amount of CoO added | 10 wt % | 10 wt % |
| Energy density per unit volume of electrode sheet | 540 mAh/cc | 590 mAh/cc |
| Ratio of utilization of active material | 95% | 95% |

The energy density per unit volume of electrode sheet was 504 mAh/cc for the conventional powder G and 590 mAh/cc for the high-density powder F as shown in Table 1, indicating that the value for F was 15 to 20% higher than that for G.

From these results and for the reason given above, it is safely concluded that in a substrate sheet of a fixed volume, the high-density powder can be loaded in a larger amount than the conventional powder.

For the high-density powder of active material to possess an energy density on the order of 600 mAh/cc as demanded in the market, the pore volume of the powder must be not more than 0.05 ml/g and the specific surface area thereof which has a proportional relation with the pore volume must fall in the range of 15 to 30 m$^2$/g. This effect of the addition of cadmium may be logically explained by a postulate that while the decrease of the specific surface area results in a reduction in the openings for passage of reaction species protons from the electrolyte, the deformation imparted to the nickel hydroxide crystals smoothens the passage of protons in the solid phase so much as to make up for the aforementioned decrease in the openings The ratio of utilization of active material means the amount of passage of protons and it is controled by the two factors, i.e. the specific surface area of the particles and the rate of diffusion inside the crystals (solid phase). It is considered that the ratio of utilization is controlled by the specific surface area where the crystals are now varied and by the internal deformation where the crystals are varied.

For the active material to react, smooth passage of electrons from the current collector to the surface of the particles of active material is an essential requirement. To the smooth passage of electrons, the presence of an electroconductive network of CoOOH particles in a free state (existing in the surface of the CoOOH particles without forming a solid solution with nickel hydroxide) is indispensable.

Figure 7:
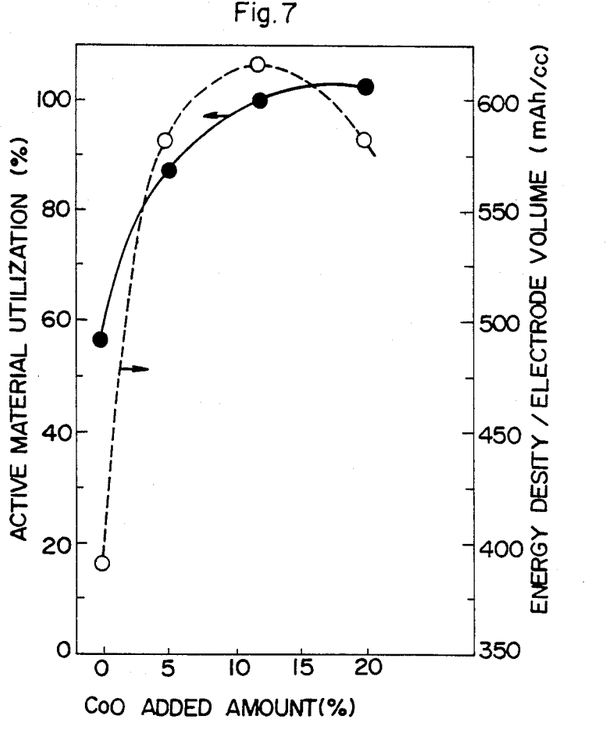
FIG. 7 is a diagram showing the relation between the amount of CoO added, the ratio of utilization of active material, and the energy density per unit volume of the electrode.
Figure 8:
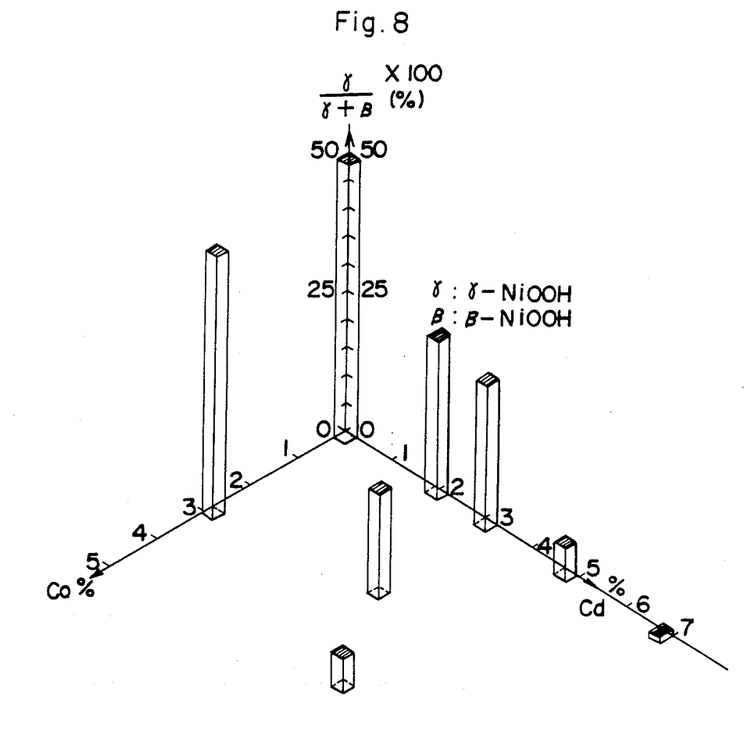
FIG. 8 is a diagram showing the relation between the composition of the active material and the amount of γ-NiOOH formed.
Figure 9:
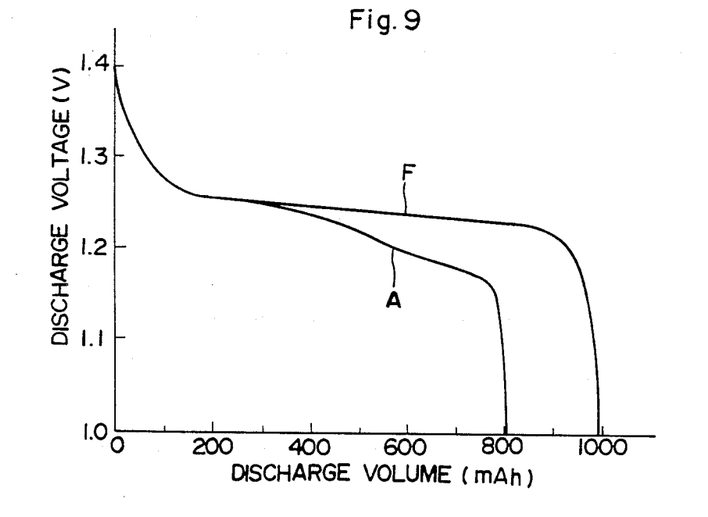
FIG. 9 is a diagram comparing an electrode suffering heavy formation of γ-NiOOH and the electrode of this invention in terms of discharge voltage characteristic.

As regards the CoO additive which is destined to form the network, FIG. 7 shows the relation between the amount of CoO added, the ratio of utilization of active material, and the energy density per unit volume of the electrode sheet. As the amount of the CoO added is increased, so the ratio of utilization of active material is heightened to be converged in the vicinity of 100%. Since the additive itself merely contributes to the electroconductivity and takes no part actually in discharge, the actual energy density of the electrode sheet tends to decline from the vicinity of 15%. FIG. 4 depicts three-dimensionally the relation of the composition of active material and the amount of formation of γ-NiOOH. When the electrode sheet is charged with a high current density of 1C and the electrode sheet is analyzed with X-ray at the end of the charging, it is found from the relation between the kind of powder and the amount of γ-NiOOH formed that the addition of cadmium in the form of solid solution to the crystals of nickel hydroxide causes the formed amount of γ-NiOOH to decrease in reverse proportion to the amount of cadmium added. FIG. 9 compares the high-density powder A containing no cadmium and the cadmium-containing high-density powder F of this invention in terms of discharge voltage characteristic. In the case of the high-density powder A containing no cadmium, the discharge voltage showes a stepped characteristic because of heavy formation of γ-NiOOH. From FIG. 8, it is clearly noted that the addition of cadmium began to manifest its effect in preventing the formation of γ-NiOOH when the amount of cadmium reached 2% and brought about complete extinction of γ-NiOOH when the amount reached 7%.

This effect of cadmium is not affected at all by the coexistence of other elements such as, for example, cobalt in the form of solid solution. Cobalt is found to exhibit a behavior similar, though only slightly, to cadmium. When the product at the end of the charging, which is trivalent $\beta$-NiOOH is perfectly reduced to bivalent $\beta$-Ni(OH)$_2$, it indicates a theoretical capacity=0.29 Ah/g (amount of active material).

Figure 10:
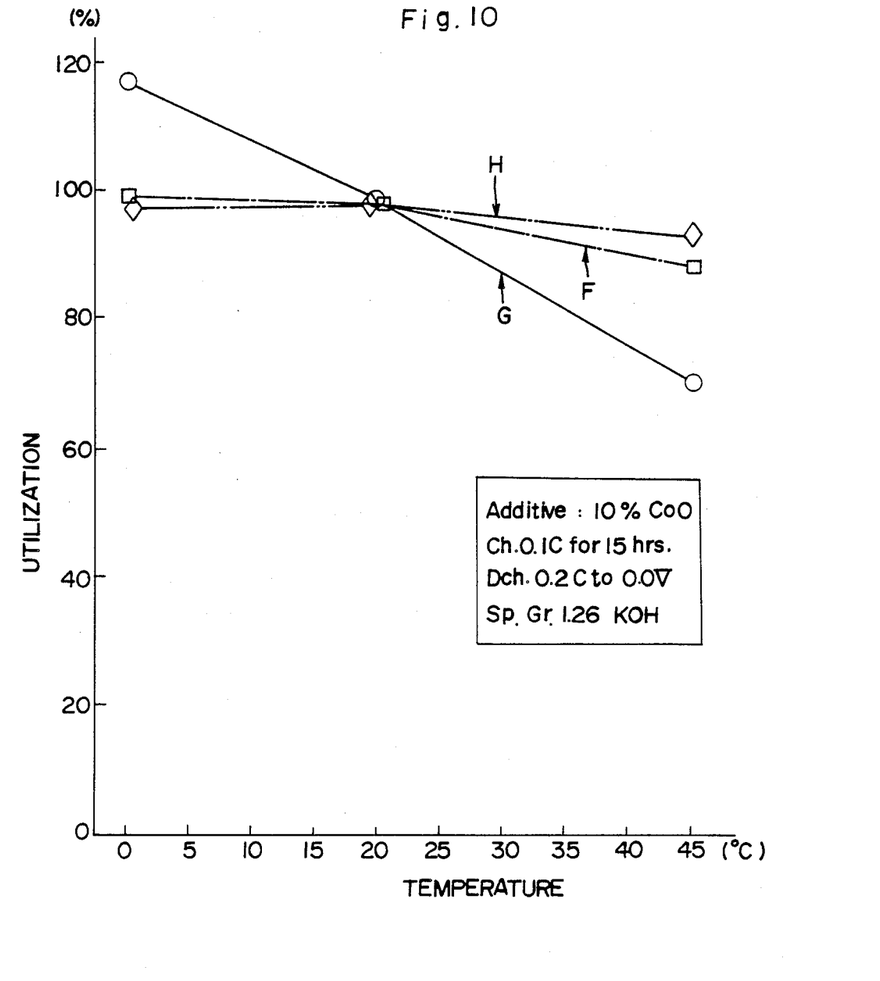
FIG. 10 is a diagram showing the relation between the active material composition, the charge-discharge temperature and the ratio of utilization of active material.

When the electrode indicates the above theoretical capacity, it is customary to regard the active material utilization as 100%. As for the nickel hydroxide electrode, such the electrode as having a heightened active material utilization can not always be considered to be an excellent electrode. For example, as disclosed in J. Power Sources, 12,219, (1984), there have sometimes been the electrodes having the active material utilization ratio exceeding 100%. Such high active material utilization ratio is caused by a formation of tetra-valent higher oxide, $\gamma$-NiOOH, wherein $\gamma$-NiOOH tends to be formed by the charging at a low temperature. For example, the particles G composed of only nickel hydroxide and having a large specific surface area, which are produced by the conventional method, indicate a high active material utilization ratio of 120% at a temperature of 0° C., as shown in FIG. 10. However, in case of the particles G, the volumetric change takes place vigorously and due to the formation of $\gamma$-NiOOH the electrode becomes swollen so that the life of the electrode may be greatly impaired. Accordingly, the crystal form of the active material at the end of charge is required to be trivalent $\beta$-NiOOH. In this sense it is not preferable that the ratio of utilization of active material exceeds 100%. Therefore, the electrode in which the formation of $\gamma$-NiOOH is suppressed in any conditions and the ratio of utilization of the active material is maintained in the vicinity of 100% can be defined as an excellent electrode. As shown in FIG. 10, in the high-density powder F containing 5% of cadmium in the form of solid solution the ratio of utilization of the active material in the vicinity of 100% is maintained even at a low temperature. The high-density powder containing 5% of cadmium and 3% of cobalt in the form of solid solution is found to improve the high-temperature performance as disclosed in Japanese Patent Application Disclosure No. Sho 59(1984) - 224,062 and to provide a little volumetric change.

Figure 11:
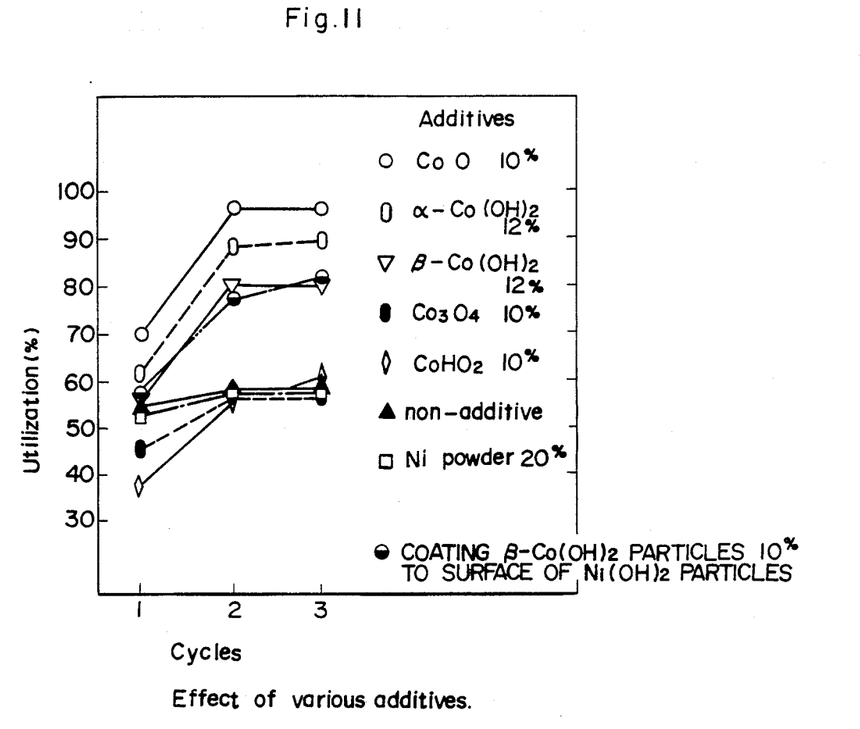
FIG. 11 is a diagram showing the relation between various kinds of cobalt compound additives and the ratio of utilization of active material.

With respect to the other additives cited above as useful for the formation of a network of CoOOH, the results similarly obtained were as shown in FIG. 11. In the decreasing order of the ratio of utilization of active material, these additives fell in this row : CoO>$\alpha$—Co(OH)$_2$>$\beta$—Co(OH)$_2$. This order of the ratio of utilization may be ascribed to the magnitude of solubility in the electrolyte. In the case of $\beta$—Co(OH)$_2$, after the injection of the electrolyte, this additive is liable to be oxidized with the dissolved oxygen to form a brown product of oxidation, Co(OH)$_3$, of poor solubility. In contrast, $\alpha$—Co(OH)$_2$ is less liable to form Co(OH)$_3$ because it has to go through the path of $\alpha$—Co(OH)$_2$→$\beta$—Co(OH)$_2$. CoO may well be called the most desirable additive because it does not form Co(OH)$_3$ at all.

More definitely, CoO which is desirable from the viewpoint of dissolving rate is produce by heating $\beta$—Co(OH)$_2$ at a temperature of 200° to 800° C. in an inert atmosphere. The pasted electrode loaded with the powder in which nickel hydroxide is dipped in HCoO$_2^-$ ions to form a cobalt hydroxide layer on the surface was inferior to the electrode formed by mixing CoO powders in respect of the ratio of utilization of active material and was as much as the electrode formed by mixing $\beta$—Co(OH)$_2$ powders in the ratio of magnetization of active material. As for the pasted electrode loaded with the powder in which a conductive CoOOH layer is formed on the surface of nickel oxyhydroxide (the powder of which obtained by removing nickel fiber which is a current collector from the electrode formed by mixing CoO powders after changing and discharging the electrode), the ratio of utilization of active material was inferior. This teaches that it is indispensably required to form a conductive network (CoOOH) of active material and current collector in the produced electrode and that the formation of the conductive network in advance on the surface of the active material provides an insufficient effect. Therefore, the nickel electrode containing CoO powder of the invention is produced by incorporating the nickel electrode in a battery housing without forming, injecting an electrolyte into the battery housing, allowing the electrode and the electrolyte to stand and effecting solution and redeposition of the CoO powder in the electrolyte. The electrode produced by the invention using the CoO additive can accomplish a theoretical ratio of utilization of active material without using a conductive additive so that it can be adopted to the sealed nickel-cadmium battery. The working examples have been described above as using a substrate of sintered metal fibers. Of course, this invention does not discriminate the nickel electrode and the alkaline battery on account of the particular type of the substrate.

The embodiments described are intended to be purely illustrative, not limitative, of the invention and persons of ordinary skill in the art, therefore, are enabled to make variations and modifications thereof without departing from the spirit and scope of the invention.

As described above, this invention provides a nickel electrode which precludes formation of the higher oxide, $\gamma$-NiOOH, permits, an improvement in the ratio of utilization of active material, and enjoys a high energy density and a long service life. Thus, this invention contributes to economy to a very large extent.

What is claimed is:

1. A pasted nickel electrode for use in an alkaline battery, said electrode including a porous alkali-proof metal fiber substrate as a current collector and an active material principally composed of a nickel hydroxide powder, said nickel hydroxide powder having a pore radius in the range of 15 to 30 Å, a total pore volume of not more than 0.05 ml/g, and a specific surface area in the range of 15 to 30 m$^2$g.

2. The nickel electrode according to claim 1, wherein said active material contains 2 to 7% by weight of cadmium as a solid solution in crystals of said nickel hydroxide.

3. The nickel electrode according to claim 2, wherein said nickel electrode contains a small amount of cobalt in the form of a solid solution in the crystal lattice of said nickel hydroxide.

4. The nickel electrode according to claim 1, wherein said nickel electrode is formed by physically mixing nickel hydroxide active material powder and 5 to 15% by weight of at least one cobalt compound powder selected from the group consisting of CoO and Co(OH)$_2$.

5. An alkaline battery made by incorporating in a battery housing and without forming a nickel electrode which includes a porous alkali-proof metal fiber substrate as a current collector and an active material principally composed of a nickel hydroxide powder, said nickel hydroxide powder having a pore radius in the range of 15 to 30 Å, a total pore volume of not more than 0.05 ml/g, and a specific surface area in the range of 15 to 30 m$^2$g, and including a cobalt compound in solid solution in crystals of said nickel hydroxide; injecting an electrolyte into said battery housing; allowing the electrode and the electrolyte to stand for at least one day, thereby effecting uniform dispersion of the cobalt compound in the electrode by dissolution and deposition; and thereafter subjecting the resultant battery to charging, thereby changing the deposited cobalt compound to cobalt oxyhydroxide.

* * * * *